Dec. 7, 1954   J. MURTAGH   2,696,348
CALCULATING DEVICE
Filed May 20, 1953   2 Sheets-Sheet 1
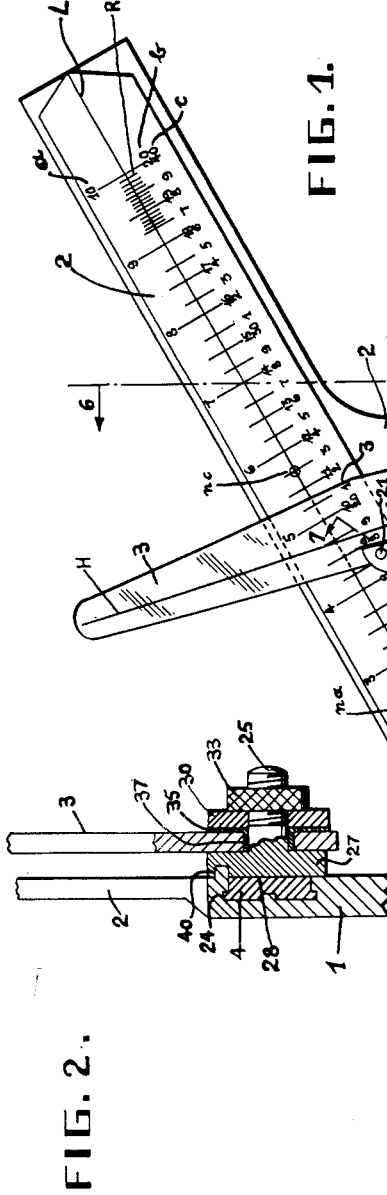
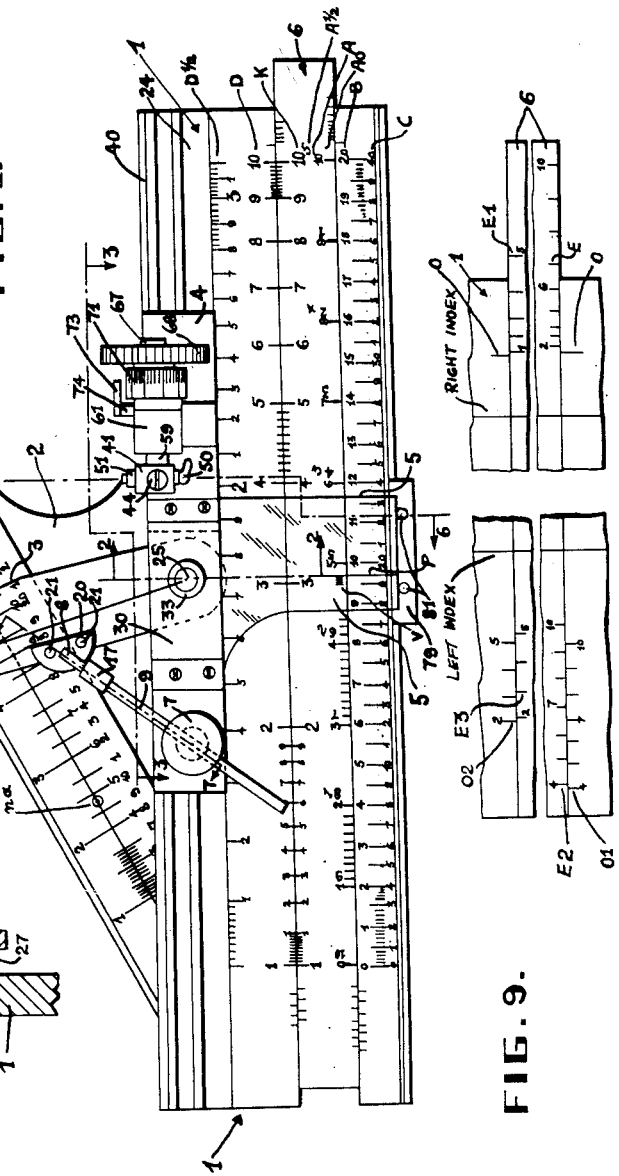
INVENTOR.
JOHN MURTAGH
BY Henry G. E. Metzler
ATTORNEY Dec. 7, 1954   J. MURTAGH   2,696,348
CALCULATING DEVICE
Filed May 20, 1953   2 Sheets-Sheet 2
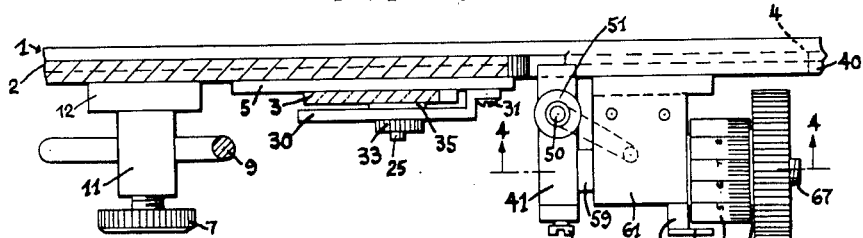
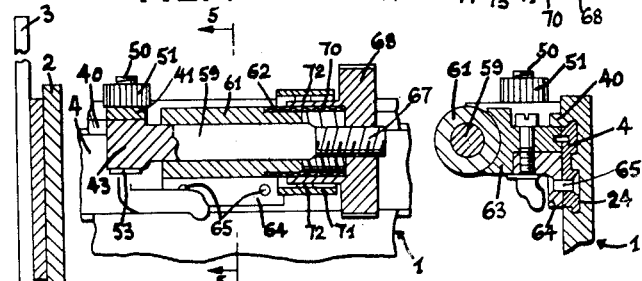
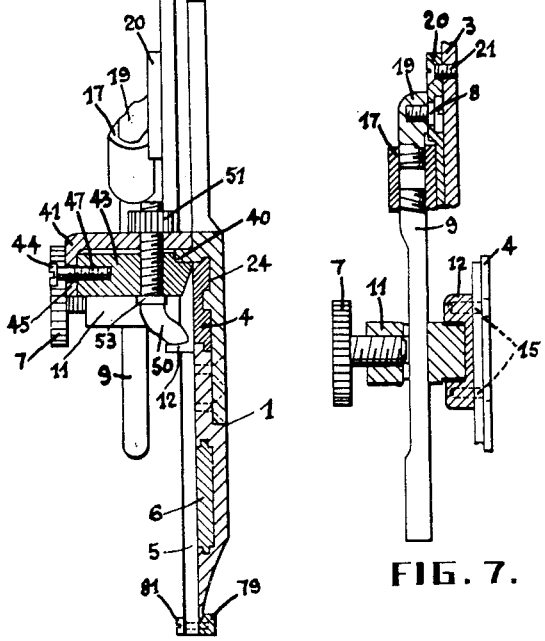
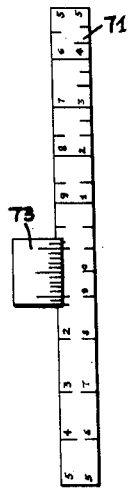
INVENTOR.
JOHN MURTAGH
BY Henry J. E. Metzler
ATTORNEY United States Patent Office 2,696,348
Patented Dec. 7, 1954

2,696,348

CALCULATING DEVICE

John Murtagh, Jersey City, N. J.

Application May 20, 1953, Serial No. 356,194

3 Claims. (Cl. 235—61)

The present application is a continuation-in-part of my copending application Serial No. 245,788, filed on September 10, 1951, which has been abandoned, and relates to improvements in calculating devices and, more specifically, to a calculating device involving a triangle system of numerical calculation which, similar to the slide rule, automatically performs various calculations involving multiplication, division, proportion, powers and roots and provides many mathematical advantages including direct reading of the logarithms of numbers to bases other than 10.

One important object of the invention is the provision of a calculating device of the character described having a graduated scale slide member which, in connection with a triangle and associated scales, will provide simple and direct means for finding any power or root of any number and for solving problems involving exponent affected numbers generally.

Another object of the present invention is the provision of a calculating device of the character described which is primarily flat, comparatively light in weight, inexpensive to manufacture, and simple to operate.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a plan or face view of a preferred embodiment of my invention;

Fig. 2 is a fractional enlarged sectional view on the line 2—2 of Fig. 1;

Fig. 3 is an enlarged fractional sectional view on the line 3—3 of Fig. 1;

Fig. 4 is a fractional sectional view on the line 4—4 of Fig. 3;

Fig. 5 is a fractional sectional view on the line 5—5 of Fig. 4;

Fig. 6 is an enlarged sectional view on the line 6—6 of Fig. 1;

Fig. 7 is an enlarged fractional sectional view on the line 7—7 of Fig. 1;

Fig. 8 is a detailed development plan view of a cylindrical dial and a vernier; and Fig. 9 is an enlarged fractional plan view of the arrangement of scales E, E1, E2 and E3.

Similar reference characters refer to similar parts throughout the several views.

In the drawing the numeral 1 denotes a longitudinal, primarily flat graduated base to which is secured by means of welding or the like a graduated limb 2, that extends at a fixed angle from the upper longitudinal edge of the base 1 and whose upper side is substantially at a common plane with the upper side of said base.

The fixed angle is preferably near 30 degrees and the base and limb members are each made of two different materials which are fused or otherwise fastened together forming integral units. A hand 3 of transparent material has one of its ends pivotally attached to a sliding member 4 and is adapted for overlaying said graduated part of the limb 2, so as to constitute with its center line the third side of a triangle formed by said base and said limb 2 with the hand 3.

A position indicator plate 5, consisting of a transparent graduated plate overlaying the graduations on the base 1, is secured to the sliding member 4 by any suitable means and extends across the base 2. On the sliding member 4 is provided a set screw 7 for retaining a rod 9, which is pivoted at 8 to the hand 3, so that the latter can be held firmly in any angular position. The set screw 7 is screwed into a partially hollow, internally threaded plug 11, through which the rod 9 is slidably extended, and the plug 11 is with its lower end screwed into a socket 12, which is secured to the sliding member 4 by means of screws 15 or the like. A longitudinal scale member 6, which is provided with common unit, logarithmical and special graduations, is slidable lengthwise on the base 1 in a groove which has slots (Fig. 6) into which extend ribs of the member 6, so that the latter is held within said groove.

A sleeve member 17, which preferably is provided with internal right and left handed threads, connects the rod 9 to an intermediate member 19, which is pivoted to a socket 20 by means of a pivot screw 8. The socket 20 is secured to the hand 3 by means of screws 21 or the like. Thus the angular position of the hand 3 can be adjusted roughly by sliding the rod 9 through the plug 11 and tightening the screw 7, and finally by turning the sleeve member 17.

The sliding member 4 is slidable in the base 1 in a groove 24, which may be of any suitable shape or design in cross-section and which extends over the entire length of the base 1. A bolt 25 having a head portion 27 which is welded at 28 (Fig. 2), or otherwise secured to the sliding member 4 extends through the lower end of the hand 3 as well as through a stepped plate 30, which overlays the hand 3 and one end of which is secured to the sliding member 4 by means of screws 31 or the like (Fig. 3). A knurled nut 33 is screwed upon the threaded shaft of the bolt 25, so that by tightening the nut 33 the free main portion of the plate 30 can be pressed upon the hand 3 for retaining the latter within a common plane. A washer 35 and a bushing 37 preferably are interposed between the hand 3 and the plate 30 as well as between the hand 3 and the bolt respectively. The parts 35 and 37 can be made as a unit or as separate parts.

Adjoining the groove 24 and parallel therewith there is provided on the base 1 a longitudinal rib 40. An angular member 41, which has a short shank and a long shank is fastened to a jaw 43 by means of a screw 44 (Fig. 6) which extends loosely through a perforation 45 in the short shank of the member 41 and which is screwed into a threaded hole 47 in the jaw 43. Opposite ends of the long shank of the member 41 and of the jaw 43 engage opposite sides of the rib 40, and a set screw 50 extends crosswise through the parts 41 and 43 and engages with its threaded portion a nut 51. The screw 50 is provided with a collar portion 53, so that by tightening the screw 50, the parts 41 and 43 can be clamped firmly to those both sides of a portion of the rib 40 on which said opposite ends of the parts 41 and 43 are slidable when the screw 50 is loose. Laterally extended from the jaw 43 there is a shaft 59. The latter, which is parallel to the base 1 and in spaced relation thereto, is slidably extended through a tubular member 61 that is provided with an exterior right handed thread 62. The member 61 is secured to, or made as a unit with a bracket 63 (Fig. 5) which, by means of an angular member 64 or the like is secured to the sliding member 4 by means of rivets 65 or by welding or the like. One end portion of the shaft 59 is provided with a left-handed thread 67 upon which is screwed a knurled nut 68. The latter is provided with an internally right-handed threaded sleeve portion 70, which is screwed upon the thread 62 of the member 61. A graduated cylindrical dial 71, a development of which is shown in Fig. 8, encompasses the sleeve portion 70 and is in frictional engagement therewith by any suitable means, preferably by means of resilient pads 72 of rubber or the like interposed between the portion 70 and the dial 71 (Fig. 4). Thus the parts 41, 43, 44, 50, 51, 59, 61, 63, 64, 68, 71 and 72 constitute means for clutching the sliding member 4 against movement along the base 1, and for micro setting it relative to the base 1 including micro reading of fractions between the graduations.

The threads 62 and 67 preferably are pitched at the ratio of one to two, so that there are for instance thirty threads to an inch at 62 and sixty threads to an inch at 67 and that one complete revolution of the nut 68 amounts to a displacement of one twentieth of an inch between the parts 61 and 59, when this is the distance between the common unit graduations. A graduated vernier 73, secured to the member 61 by means of a block 74 or the like, overlays a portion of the cylindrical dial 71 but is not in frictional contact therewith and is adapted for indicating the zero portion and for allowing fine readings of the rotative position of the dial 71.

The rough positioning of the sliding member 4 on the base 1 is done manually by pushing it into an approximately desired position. Then the parts 41 and 43 are tightened on the rib 40 by manipulating the screw 50, whereupon the sliding member 4 is brought into the exact position by rotating the nut 68 in substantially the same manner as a micrometer. The groove 24 confines the sliding member 4 and in turn the central axis of rotation of the hand 3 to movement along a straight line relative to the base 1. The position indicator plate 5, which is rigidly attached to the sliding member 4, preferably is also slidably anchored to the lower edge of the base 1 by means of a bar 79 (Figs. 1 and 6), which is secured to lower end of the plate 5 by means of screws 81 or the like.

The main scales are:
a, b, and c on the limb 2;
K, A, A½ and A0 on the slide 6; and,
D, D½, B and C on the base 1.

The a, b, c, A, B, C, A½ and A0 scales have common unit spacing and are referred to as common unit scales.

The D, D½ and K scales are logarithmic and are referred to as log. scales.

The a, b, and c scales along the limb 2 are as follows:
a is divided into ten equal parts numbered 1 to 10,
b is divided into twenty equal parts numbered 1 to 20, and
c is divided into forty equal parts numbered 1 to 40.

These main divisions are referred to as "prime units" and all 3 scales depend on a single line of fine graduations "R" for subdivision of them.

The prime unit length ratio between the a, b, and c scales is a=1, b=½ and c=¼, and the numbering ratio is a=1, b=2 and c=4.

The prime unit length spacing and ratio of scales A, B and C is the same as a, b, and c respectively.

The prime unit length of A½ is twice that of A and the numbering one half as large (1 to 5).

The A scale prime units are divided into ten parts by graduation marks, and A0 and A½ depend on these same graduations for division of their prime units.

The A0 scale is the same as A except that it is numbered in reverse order "right to left".

A and A0 have special marks for reading at 33⅓ and 66⅔.

The B and C scales depend on a single line of fine graduations which divide the B scale prime units into ten and the C scale units into five parts.

The log. scales K on the slide 6 and D on the adjoining surface are identical scales with numbering 1 to 10.

The log scale D½ has a unit length ratio with respect to D of 2 to 1 and extends to $\sqrt{10}$ opposite 10 on D with prime numbering to 3 which is opposite 9 on D and having the usual secondary numbering and graduation.

A center line L extends throughout the length of the limb 2 defining one of the fixed sides of a triangle and passing through the center of the fine graduations R; the fine graduation marks crossing the L line at a right angle and projecting a short distance on each side of the line.

A center line H which defines the angularly adjustable side of the above mentioned triangle extends throughout the length of the hand and is in alignment with the central axis around which the hand is angularly movable.

The base line is the line over which the central axis of the hand is movable.

This line is necessarily theoretical for no mark defines its position; it follows that the intersection of the base and limb lines, which is the point from which all graduation and numbering along these lines proceed, is also theoretical.

An indicator line P on the indicator plate 5 extends across the base 1 in alignment with the central axis of rotation of the hand and is right-angularly disposed to the base line and to the groove along which member 4 is moveable.

A vernier scale V on the plate 5 overlays the scale A on the slide 6. It consists of only 4 very fine graduation marks which are spaced and positioned so as to divide the A scale graduated units into five equal parts.

This vernier is used only when a number on the scale A is drawn under the P line by sliding 6 along its groove while the P line is in a fixed position.

All graduations and lines on the indicator plate 5 and the hand 3 are on the under side of these transparent members.

A dial scale on dial 71 is numbered in both direct and reverse order as shown at Fig. 8.

Normally the parts 68 and 71 rotate together but, as their connection is frictional, either member many be rotated while the other is held against rotation.

All scales along the base and limb lines express the distance along these lines from their theoretical point of intersection.

All calculation involving the triangle proceeds along these lines and the office of the P line, in this connection, is to project numbered and graduated positions along the base on to the base line and inversely to project positions along the base line on to the scales where they can be read.

Setting of the P line at a given number is always prior to the setting of the hand 3, which is then set at a given number or position along the limb 2 by angular movement around its axis.

The hand must then be clamped against farther angular change before member 4 is moved along its groove.

To set the hand at a given number on the scale a, scale b or scale c means, as the term is used here, that the hand line H is set at a position on the limb line L according to scale a, scale b, or scale c each of which expresses the distance along the limb line acording to a different unit length.

The main index positions along the L line are at 10 along each of the scales, a at extreme right, b at the one half and c at the one quarter position along the scales.

Any of these positions may be used regardless of the scale on which P has been set as for example:

When P is set at 15 on scale B, to find 1.5 times 8; H may be set at the index on the scale a and after clamping the angle, move member 4 along its groove until H is at 8 on the scale a and read 12 on scale B.

Or H may be set at index on scale b and move to 8 on scale b and read the same as before, "12 on B."

Also when both P and H are set at given numbers and the angle clamped, movement may be to a number along the L line on a scale other than the scale on which H has been set: as when P is set at 32 on scale C and H at 16 on scale b to find 7/16 of 32, move member 4 a short distance to the left until the H line is at 7 on scale a and read 14 on scale B. (The cross scale reading at P being the same as the cross scaling that has occurred along the limb line.)

The following is a detailed description of examples of the operations when precision is required:

To multiply 13242 by 143, set the P line at 132 on scale B and tighten screw 50.

Manipulate nut 68 until setting is exact and set dial at zero (by rotating 71 relative to 68).

Turn nut 68 to right until dial 71 reads 4.2.

Set line H on hand 3 at index on scale b (10 as unity) and tighten screw 7.

Manipulate sleeve 17 until H is exactly at index.

Loosen screw 50 and move member 4 along base 1 until the hand line H is at 143 on scale b along line L on limb 2.

Manipulate 68 until line H is exactly at 143 and set dial at zero.

Turn 68 to the left until the P line is exactly at the nearest graduation (to the left) and read 189 at P, read 3.6 on dial and write 18936 as the product to 5 places.

(68 is designed to turn to the right, or to the left according to the resulting directions of displacement of member 4.)

The principle of ratio calculation by means of the triangle may be applied to exponent calculation as conducted along the logarithmic scales and the following examples are typical of the procedure:

To find the cube root of 64, set the P line at 6.4 on log. scale D; set the H line at 3 and, after clamping the angle, move member 4 along its groove until the H line is at 1.

Then draw member 6 to position where 33⅓ of scale A0 is under the P line and read 4 "the indicated root" on scale D opposite right index of scale K.

In this example the H line may be set at 30 on scale c and the movement be to 10 on the same scale, it being necessary, only, that the number at which H is set, and the number moved to, along the same scale, express the denominator to numerator ratio of the exponent.

As involvements of 10, in a number, affect a change in the digit reading of its roots, the number at which P is set, must be basically between 1 and 10. When the number is less than 1 or more than 10 the scale slide 6 must be employed for the final reading.

To find $(72)^{0.4}$ set the P line at 7.2 on scale D and the H line at 10 on scale $a$; then after clamping the angle move member 4 along its groove until the H line is at 4 (10 to 4 along scale $a$) and the reading at the P line "2.2" on scale D is the power of 7.2.

Then slide member 6 to a position where 4 of scale A0 is under the P line and the reading on scale D opposite right index of scale K is 5.53 which is the 0.4 power of 72.

If the exponent .4 is negative as —.4 the reading is on scale K opposite left index of scale $D = .181$.

If the involvement of 10 in 7.2 is negative as .72 draw 4 of scale A under the P line and read on scale D opposite the right index of scale $K = .877$.

The number .4 which is drawn under the P line is the logarithm of the indicated power of 10; and when the number whose power is required differs from the basic setting by 2, 3 or more decimal places as in .072, 720, and 7200 the number drawn under the P line is 2, 3 or more times the fractional exponent which in this example is 2, 3, etc. times .4 = .8, 1.2 etc. except that only fractions are drawn under the line (as .2 when the number is 1.2).

When in this example, 2 on scale A0 is drawn under the P line the basic reading on scale D opposite the right index of scale K is 3.49 and the 1 that was dropped from 1.2 indicates a shift of the decimal point one place to the right = 34.9 as the power of 7200.

When the exponent contains an integer and would normally move the basic reading beyond the limits of the instrument a different method is employed which involves use of the B and C scales for reading logarithms of the square on B, and of the fourth power on the scale C of the numbers along the D scale.

When these readings are added to the logarithms of the numbers along scale D the result is the logarithm of the third and of the fifth power respectively.

If in the above example the exponent instead of being ⁴⁄₁₀ is ⅘, substitute 3 for 1, as ⅗, if the logarithm to be added is according to scale B, and 5, as ⅘, when it is according to scale C.

With the P line set at 7.2 on scale D, set the H line at 5 on scale $a$, and with the angle remaining constant move member 4 along its groove until the H line is at 4 and the reading at the P line "4.85" on scale D is the ⅘ power of 7.2, also at the P line read 2744 on scale $C = 2.744$. Then dropping the integer "2" slide member 6 to position where 744 of scale A0 is under the P line and read 269 on scale D opposite left index of scale $K = 2690$ (the fourth power of 7.2).

If the number is 72, add 4 places, and if it is .72 subtract 4 places.

This method may be applied generally in finding powers of numbers.

To read logarithms of numbers to bases other than 10, taking 3 for example; set the P line at 3 on scale D and the H line at unity (10 on scale $b$); then, with the angle remaining constant, move member 4 until the P line is at a given number on scale D and read its logarithm on scale $b$ or to a number on scale D½ and read on scale $a$;

*Example.*—Move to position where the P line is at 4 on scale D and read 1.26 on scale $b$ or .63 on scale $a$ (the logarithms of 4 and of 2 to base 3).

For the reading of natural logarithms a special mark consisting of a small, round, red dot whose center is on the L line and slightly to the right of the 23 reading position along scale $a$ and another at the same reading position along scale $c$ may be provided. They are referred to as "$na$" and "$nc$".

The reading at the center of these marks is 23026, and as $(E)2.3026 = 10$, when E is the natural base; they serve as a direct cross scaling position between the common unit scale A and log. scale D for numbers that exceed 1 by only a very small fraction as $1.000n$ in which $n$ is any number along scale A (unity being assumed at the 0 position when this scale is employed as a log. scale).

As the natural logarithm of numbers as large as, for example, 1.007 is slightly smaller than the fraction and is considerably smaller when the fraction is as large as .07, special sub scales are provided which give the required displacement of member 6 so that the P line may be set at natural log. 1.02, 1.03 ... to 1.1 and also the displacement necessary for 1.003 ... to 1.01.

These scales, an enlarged view of which is shown in Fig. 9, are short sections of graduation marks; E and E1 being to the right of right index, and E2 and E3 to the left of left index on slide 6. A sub-index "0" is provided on member 1 a short distance to the right of the right index.

The 9 graduation marks "E" which refer to the 9 prime unit positions 2, 3, 4 to 10 along scale A when these are used logarithmically as 1.02, 1.03, 1.04 ... to 1.1 are each positioned at a distance to the right relative to sub-index "0" according to the difference between .02, .03, .04 ... to .1 and the natural logarithms of 1— these numbers.

*Example.*—Subtract the natural log. of 1.07 from .07 = .00234, which is .234 of the A scale prime unit and is the distance of the graduation mark 7 of sub-scale E from the sub-index "0" when slide 6 is at zero position.

When slide 6 is moved to a position where this mark is in alignment with sub-index "0" then 7 of scale A is at the natural logarithm of 107.

Set the P line at this position and the reading on log. scale D is the 23.026th power of $1.07 = 4.75$.

Set the H line at "$nc$" and after clamping the angle move member 4 until the H line is at 4 on scale $b$ and read on scale D½ the fourth power of $1.07 = 1.31$ or move until the H line is at 30 on scale $c$ and read on scale D the 30th power of $1.07 = 7.61$.

Any power of 1.07 within the limits of the instrument may be read by moving to the position where it is indicated on the scales $b$ or $c$.

The displacement of the slide 6 for logarithmic setting at numbers 1.004 to 1.01 along the scale A is provided by sub-scale E2. As this displacement is very small a series of 7 graduations at common unit spacing is provided on member 1 each of which is used as an index for the corresponding mark on slide 6.

The displacement of the slide 6 when the corresponding marks that refer to a prime unit $n$ on the scale A are brought to alignment is the difference between $.00n$ and the natural logarithm of $1.00n$.

The sub-scales E1 and E3 are used in connection with scale A½. They are similar to E and E2 except that the displacement which they provide is 2 times as large for a given number. E1 provides the displacement for numbers 1.01 to 1.05 and E3 for numbers 1.002 to 1.005.

The A½ scale is employed logarithmically the same as the scale A except that it refers directly to log. scale D½.

To find the amount of a debt after it has accumulated annual compound interest at 6% for a number of years, set the slide 6 at position where graduation mark 6 of sub-scale E is in alignment with sub-index 0; then set the P line at 6 as it appears on scale A, set the H line at the $nc$ mark and clamp the angle, then if the original debt is $84.00 and the time 13 years, move the slide 6 to position when 84 on scale K is at right index of scale D and move member 4 until the H line is at 13 on scale $c$; then read at the P line on scale K $179 = \$179.00$ the amount of the debt at 13 years.

Member 4 may then be moved to a position where any time period is indicated in years at the H line on scale $c$ and read at the P line on scale K the amount of debt at the time indicated.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent of the United States is:

1. A calculating device comprising a substantially flat angular member having a first graduated branch provided with a pair of parallel longitudinal grooves and a second graduated branch extending angularly from said first branch, a graduated scale member being slidable in one groove of said first branch, a sliding member being movable in the other groove of said first branch, a transparent hand pivoted to said sliding member overlaying said second branch so as to form the third side of a triangle whose two other sides consist of said first graduated branch and said second graduated branch of said angular member, and a transparent indicator plate overlaying the graduated surface of said first branch and said graduated scale member and being secured to said sliding member and provided with an indicator line which is in alignment with the pivot around which said hand is movable on said sliding member.

2. A calculating device comprising a substantially flat angular member having a first graduated branch provided with a pair of longitudinal grooves and a second graduated branch extending at an acute angle from said first branch and having a center line extending throughout its length, a graduated scale member being slidable in one groove of said first branch, a sliding member being slidable in the other groove of said first branch, a pivot pin extending from the front portion of said sliding member, a transparent hand pivoted to said sliding member by means of said pivot pin having a center line extending from the center of said pivot pin throughout the length of the hand and overlaying said second branch and forming the third side of a triangle whose two other sides are formed by said first and said second branches, adjustable means for holding said hand in an angular position relative to said sliding member being provided at said sliding member, and a transparent graduated plate overlaying the graduated portion of said first branch being secured to said sliding member and provided with an indicator line which is in alignment with the center of said pivot pin and right angularly disposed to the groove in which said sliding member is slidable.

3. A calculating device comprising a substantially flat angular member having a first graduated branch over whose entire length parallel longitudinal grooves are extended and having also a second graduated branch extending at an acute angle from said first branch, a graduated scale member being slidable in the first one of said grooves of said first branch, a sliding member slidable in the second one of said grooves of said first branch, a pivot pin extended from the face of said sliding member, a transparent hand rotatably secured to said sliding member by means of said pivot pin and overlaying said second branch and having a center line extended from the center of said pivot pin throughout the length of the hand and forming an angularly adjustable side of a triangle whose two other sides are relatively fixed by the first and the second branch of said angular member, a transparent graduated plate overlaying the graduated portion of said first branch being secured to said sliding member and provided with an indicator line which is in alignment with the center of said pivot pin, means for precise setting of said sliding member on said angular member and for micro reading of its positions on the first branch of said angular member, and means for precise setting and clamping of said hand at angular positions being interposed between said sliding member and said hand, said graduated scale member being provided with logarithmical and common unit scales, said first branch having scales on both sides of the groove within which said graduated scale member is movable, and said second branch having scales on both sides of a center line extended throughout its length.

No references cited.